United States Patent
Garth et al.

(10) Patent No.: US 6,272,486 B1
(45) Date of Patent: Aug. 7, 2001

(54) DETERMINING THE OPTIMAL NUMBER OF TASKS FOR BUILDING A DATABASE INDEX

(75) Inventors: John Marland Garth; James Alan Ruddy, both of Gilroy, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/061,596

(22) Filed: Apr. 16, 1998

(51) Int. Cl.[7] .................................................. G06F 17/30
(52) U.S. Cl. ...................... 707/2; 707/7; 707/1; 707/202
(58) Field of Search .................................. 707/1, 2, 3, 4, 707/5, 6, 7, 8, 9, 10

(56) References Cited

U.S. PATENT DOCUMENTS

| | | | |
|---|---|---|---|
| 5,204,958 | * | 4/1993 | Cheng et al. ........................ 395/600 |
| 5,386,583 | * | 1/1995 | Hendricks ........................... 395/800 |
| 5,467,471 | * | 11/1995 | Bader .................................. 395/600 |
| 5,495,608 | * | 2/1996 | Antoshenkov ....................... 395/600 |
| 5,537,622 | * | 7/1996 | Baum et al. ......................... 395/800 |
| 5,546,571 | * | 8/1996 | Shan et al. ........................... 395/600 |
| 5,560,007 | * | 9/1996 | Thai ..................................... 395/600 |
| 5,579,515 | * | 11/1996 | Hintz et al. .......................... 395/607 |
| 5,611,076 | * | 3/1997 | Durflinger et al. .................. 395/613 |
| 5,666,525 | * | 9/1997 | Ross .................................... 395/602 |
| 5,680,607 | * | 10/1997 | Brueckheimer ..................... 395/607 |
| 5,842,197 | * | 11/1998 | Ho ........................................ 707/2 |
| 5,842,208 | * | 11/1998 | Blank et al. .......................... 707/7 |
| 5,852,822 | * | 12/1998 | Srinivasan et al. .................. 707/4 |
| 5,873,091 | * | 2/1999 | Garth et al. ........................ 707/102 |
| 5,918,225 | * | 6/1999 | White et al. ............................ 707/3 |

OTHER PUBLICATIONS

Balakrishna R. Iyer, et al., "Percentile Finding Algorithm For Multiple Sorted Runs", Proceedings of The Fifteenth International Conference on Very Large Data Bases, pp. 135–144, 1989.*

Aronoff, Eyal, et al, Advanced Oracle Tuning and Administration, Osborne McGraw–Hill, pp. 161, 181, 255, 266, 322, 328, 350, 354, 406, Dec. 1997.*

Stevens, W. Richard, Advanced Programming in the UNIX Environment, Addison–Wesley Publishing Co., pp. 73–75, 427–430, Dec. 1992.*

Taylor, Dave, et al, Sams' Teach Yourself UNIX in 24 Hours, Sams Publishing, pp. 80–90, Dec. 1997.*

* cited by examiner

Primary Examiner—John Breene
Assistant Examiner—Greta Robinson
(74) Attorney, Agent, or Firm—Pretty, Schroeder & Poplawski, P.C.

(57) ABSTRACT

A method, apparatus, and article of manufacture for a computer-implemented building indexes system. Indexes are built for a database that is stored in a data storage device coupled to a computer. An amount of available memory is determined. An amount of memory for use in transmitting data between extract, sort, and index build tasks is determined. Then, a number of sort tasks to be used to build indexes is determined based on the determined amount of available memory, the determined amount of memory for use in transmitting data between tasks, and task memory requirements.

36 Claims, 4 Drawing Sheets

DETERMINING THE OPTIMAL NUMBER OF TASKS FOR BUILDING A DATABASE INDEX

CROSS-REFERENCE TO RELATED APPLICATION

This application is related to the following and commonly-assigned patent application:

Application Ser. No. 08/838,647, now U.S. Pat. No. 5,842,208 entitled "HIGH PERFORMANCE RECOVER/ BUILD INDEX SYSTEM BY UNLOADING DATABASE FILES IN PARALLEL," filed on Apr. 9, 1997, by Ted E. Blank, et al., which is incorporated by reference herein.

BACKGROUND OF THE INVENTION

1. Field of the Invention

This invention relates in general to computer-implemented database systems, and, in particular, to determining the optimal number of tasks for building a database index in a (virtual) memory constrained environment.

2. Description of Related Art

Databases are computerized information storage and retrieval systems. A Relational Database Management System (RDBMS) is a database management system (DBMS) which uses relational techniques for storing and retrieving data. Relational databases are organized into tables which consist of rows and columns of data. The rows are formally called tuples. A database will typically have many tables and each table will typically have multiple tuples and multiple columns. The tables are typically stored on direct access storage devices (DASD) such as magnetic or optical disk drives for semi-permanent storage.

A table can be divided into partitions, with each partition containing a portion of the table's data. By partitioning tables, the speed and efficiency of data access can be improved. For example, partitions containing more frequently used data can be placed on faster data storage devices, and parallel processing of data can be improved by spreading partitions over different DASD volumes, with each I/O stream on a separate channel path. Partitioning also promotes high data availability, enabling application and utility activities to progress in parallel on different partitions of data.

An index is an ordered set of references to the records or rows in a database file or table. The index is used to access each record in the file using a key (i.e., one of the fields of the record or attributes of the row). However, building an index for a large file can take a considerable amount of elapsed time. The process involves extracting a key value and record identifier (rid) value from each of the records, sorting all of the key/rid values, and then building the index from the sorted key/rid values. Typically, the extracting, sorting, and index build processes are performed serially, which can be time consuming in the case of a large database file. Additionally, even if some of the tasks are performed in parallel, due to memory constraints, there could be inefficiencies in the processes.

When data is loaded or reorganized, indexes are built that provide access to the data. Building these indexes, however, can be very time consuming. Additionally, when computer systems fail, indexes could be corrupted or destroyed, and recovery of the indexes, which involves rebuilding each index, can be very time consuming. Therefore, there is a need in the art for techniques that build indexes more efficiently.

SUMMARY OF THE INVENTION

To overcome the limitations in the prior art described above, and to overcome other limitations that will become apparent upon reading and understanding the present specification, the present invention discloses a method, apparatus, and article of manufacture for a computer-implemented building indexes system. In accordance with the present invention, a database is stored in a data storage device coupled to a computer. An amount of available memory is determined. An amount of memory for use in transmitting data between extract, sort, and index build tasks is determined. Then, a number of sort tasks to be used to build indexes is determined based on the determined amount of available memory, the determined amount of memory for use in transmitting data between tasks, and task memory requirements.

An object of the invention is to provide a more efficient index building system. Another object of the invention is to determine the number of sort tasks that can be invoked to build indexes. Yet another object of the invention is to determine the number of extract tasks that can be invoked to build indexes.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and which is shown by way of illustration a specific embodiment in which the invention may be practiced. It is to be understood that other embodiments may be utilized as structural changes may be made without departing from the scope of the present invention.

Hardware Environment

Figure 1:
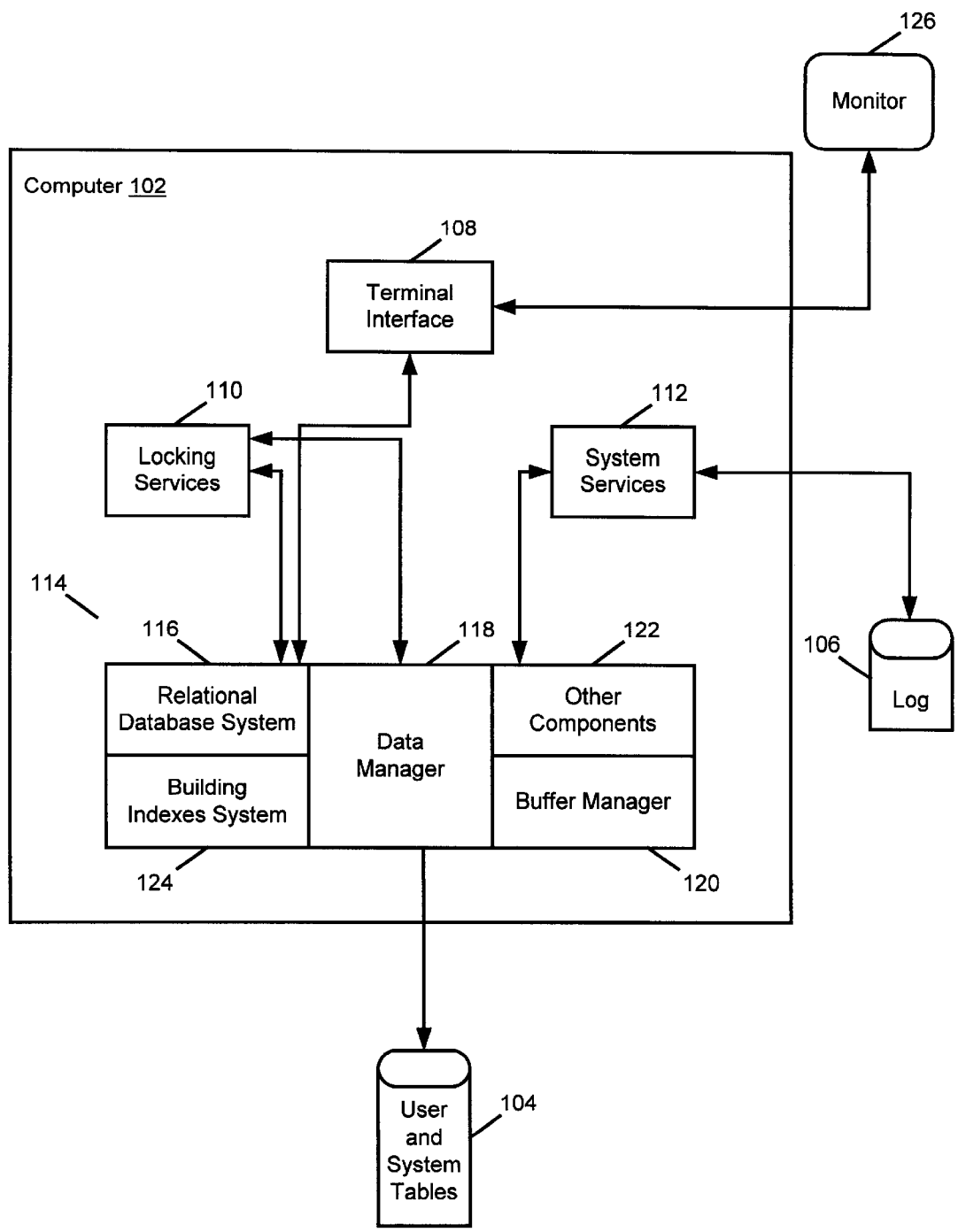
FIG. 1 illustrates an exemplary computer hardware environment that could be used in accordance with the present invention.

FIG. 1 illustrates an exemplary computer hardware environment that could be used in accordance with the present invention. In the exemplary environment, a computer system 102 is comprised of one or more processors connected to one or more data storage devices 104 and 106 that store one or more relational databases, such as a fixed or hard disk drive, a floppy disk drive, a CDROM drive, a tape drive, or other device.

Operators of the computer system 102 use a monitor 126 and a standard operator interface 108, such as IMS/DB/ DC®, CICS®, TSO®, OS/390®, ODBC® or other similar interface, to transmit electrical signals to and from the computer system 102 that represent commands for performing various search and retrieval functions, termed queries, against the databases. In the present invention, these queries conform to the Structured Query Language (SQL) standard, and invoke functions performed by Relational DataBase Management System (RDBMS) software.

The SQL interface has evolved into a standard language for RDBMS software and has been adopted as such by both the American National Standards Institute (ANSI) and the International Standards Organization (ISO). The SQL interface allows users to formulate relational operations on the tables either interactively, in batch files, or embedded in host languages, such as C and COBOL. SQL allows the user to manipulate the data.

In the preferred embodiment of the present invention, the RDBMS software comprises the DB2® product offered by IBM for the MVS® or OS/390® operating systems. Those skilled in the art will recognize, however, that the present invention has application to any RDBMS software, whether or not the RDBMS software uses SQL.

As illustrated in FIG. 1, the DB2® system for the MVS® operating system includes three major components: the Internal Resource Lock Manager (IRLM) 110, the Systems Services module 112, and the Database Services module 114. The IRLM 110 handles locking services for the DB2® system, which treats data as a shared resource, thereby allowing any number of users to access the same data simultaneously. Concurrency control is required to isolate users and to maintain data integrity. The Systems Services module 112 controls the overall DB2® execution environment, including managing log data sets 106, gathering statistics, handling startup and shutdown, and providing management support.

At the center of the DB2® system is the Database Services module 114. The Database Services module 114 contains several submodules, including the Relational Database System (RDS) 116, the Data Manager 118, the Buffer Manager 120, the Building Indexes system 124, and other components 122 such as an SQL compiler/interpreter. These submodules support the functions of the SQL language, i.e. definition, access control, interpretation, compilation, database retrieval, and update of user and system data. The Building Indexes system 124 works in conjunction with the other submodules to rebalance partitioned data. The Building Indexes system 124 includes extract, sort, and index build programs that are used to build indexes.

Generally, the RDBMS software, including the extract, sort, and index build programs of the Building Indexes system 124, and the instructions derived therefrom, are all tangibly embodied in a computer-readable medium, e.g. one or more of the data storage devices 104 and 106. Moreover, the RDBMS software and the instructions derived therefrom, are all comprised of instructions which, when read and executed by the computer system 102, causes the computer system 102 to perform the steps necessary to implement and/or use the present invention. Under control of an operating system, the RDBMS software and the instructions derived therefrom, may be loaded from the data storage devices 104 and 106 into a memory of the computer system 102 for use during actual operations.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Figure 2:
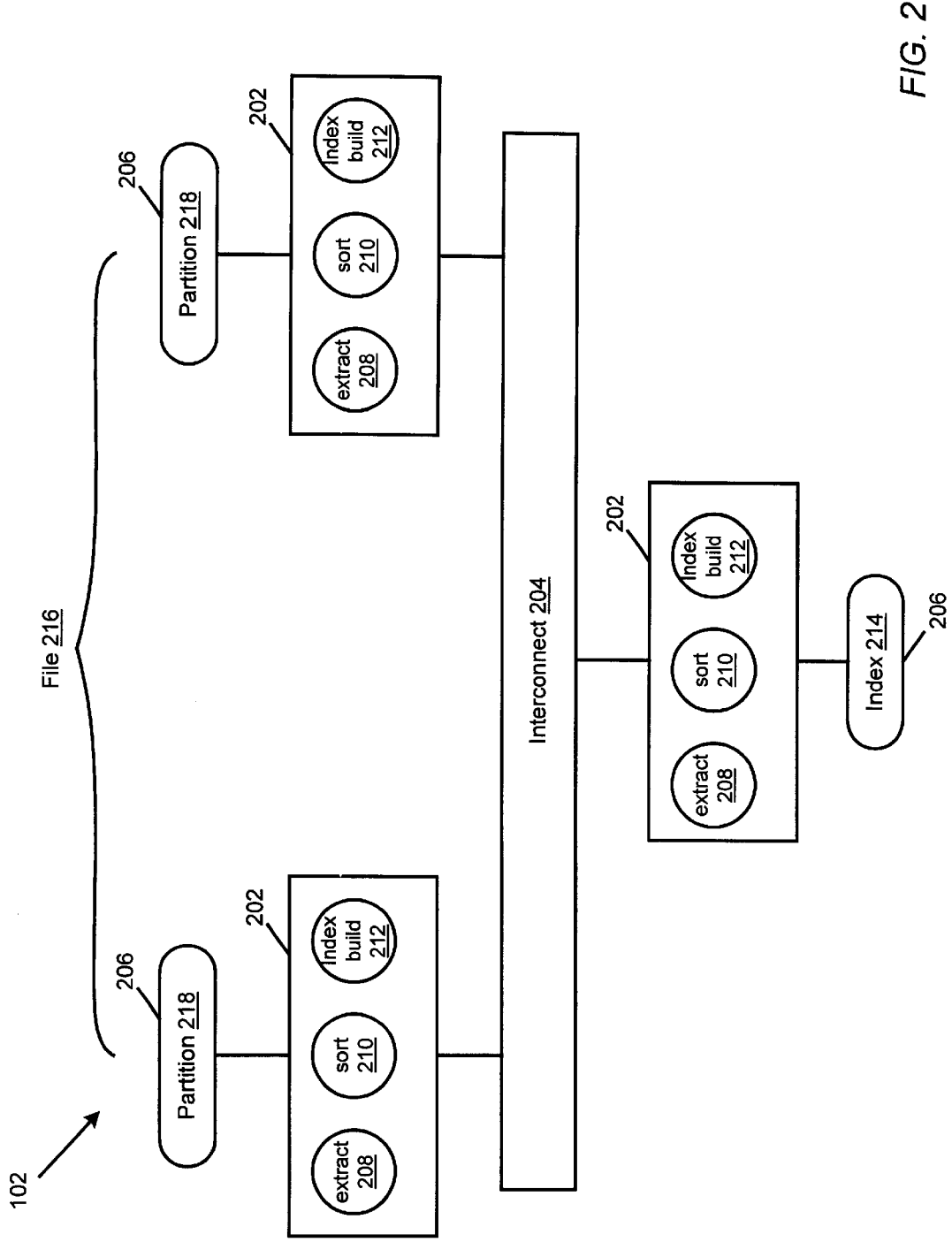
FIG. 2 is a block diagram illustrating, in further detail, the exemplary hardware environment used to implement the preferred embodiment of the invention.

FIG. 2 is a block diagram illustrating, in further detail, the exemplary hardware environment used to implement the preferred embodiment of the invention. In the exemplary environment, the computer system 102 is comprised of one or more processors 202 coupled via an interconnect 204. One or more peripheral devices 206, including fixed and/or removable data storage devices such as a hard disk, floppy disk, CD-ROM, tape, etc., may be coupled to each of processors 202.

The present invention is typically implemented using a number of computer programs executed in parallel by the processors 202, including extract programs 208, sort programs 210, and index build programs 212. Using these computer programs, the present invention builds one or more indexes 214 for a database file 216 having one or more partitions 218, all of which are stored in one or more of the data storage devices 206. Preferably, each of the partitions 218 is extracted in parallel by the extract programs 208 and the extract results are then sorted in parallel by the sort programs 210, in order to enhance the performance of the system. In particular, each extract program 208 forwards data to each sort program 210.

Determining the Optimal Number of Tasks for Building a Database Index

The Building Indexes system 124 improves the efficiency of building indexes in a system in which multiple tasks extract index keys from a database, sort the extracted index keys, and build indexes from the sorted index keys. In particular, the performance of such a system can be improved by increasing the number of tasks that are performed in parallel. However, each task requires some amount of memory, so in a computer system with a limited amount of memory available, there is a limit on the number of tasks that can be successfully executed. The Building Indexes system 124 determines the optimal number of tasks that can be executed for efficiently building a database index in a memory constrained environment. The Building Indexes system 124 is advantageous in that it can be used for building indexes in various situations, for example, when loading a database initially, when reorganizing a database, or when rebuilding a database.

In determining the optimal number of tasks, the Building Indexes system 124 takes into account the amount of memory available to be used in the system, the amount of memory required by each task, and the amount of memory required for communication between the tasks. The Building Indexes system 124 uses extract tasks to extract keys from the database files in parallel, sort tasks to sort keys for the indexes in parallel, and index build tasks to build the indexes in parallel.

Each of these tasks requires a minimum amount of memory to successfully accomplish its work. In addition, the tasks communicate with each other through pipes, which allow one task to pass data to one other task. The pipe itself requires some minimum amount of memory (i.e., communication memory).

The following symbols represent the quantities used by the Building Indexes system 124 to calculate the optimal number of tasks to invoke to build indexes:

| | |
|---|---|
| $N_u$ | the number of extract tasks |
| $M_u$ | the memory required by an extract task |
| $N_s$ | the number of sort tasks |
| $M_s$ | the memory required by a sort task |
| $N_b$ | the number of index build tasks |
| $M_b$ | the memory required by an index build task |
| $M_p$ | the memory required by a pipe |
| VS | the amount of memory available to be used |

Figure 3:
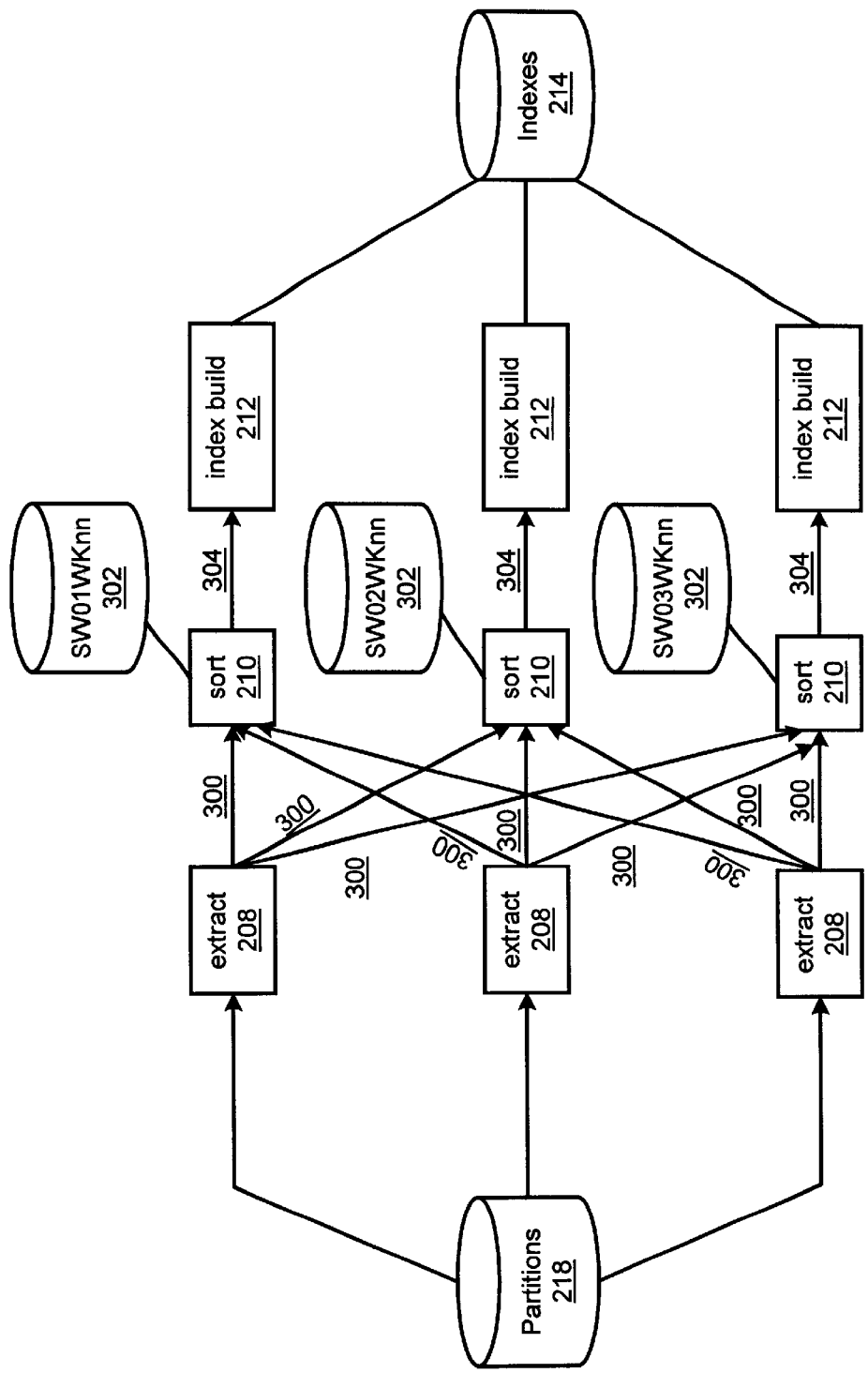
FIG. 3 is a dataflow diagram illustrating the operation of one embodiment of the Building Indexes system.

Each of the quantities used to determine the optimal number of tasks can vary, leading to many possible scenarios. FIG. 3 is a dataflow diagram illustrating the operation of one embodiment of the Building Indexes system 124. For example, in FIG. 3, there are three extract tasks 208, which extract data from partitions 218. The extract tasks 208 extract one or more keys from the records in the partitions 218 for building one or more indexes. The extract tasks 208 pass the extracted keys to the three sort tasks 210. For example, one of the extract tasks 208 can extract three different keys from the partitions 218. Then, the extract task 208 can send a first key to a first sort task 210, a second key to a second sort task 210, and a third key to a third sort task 210. The extracted keys are passed via the pipes 300 that connect each extract task 208 to each sort task 210.

Then, the sort tasks 210 sort the extracted keys using memory, for example, files 302. Each sort task 210 sorts keys for building a particular index 214, and each index build task 212 builds one of the indexes 214. Therefore, each sort task 210 corresponds to one index build task 212. The sort tasks 210 pass the sorted keys to the index build tasks 212 via the pipes 304. The index build tasks 212 build the indexes 214 using the sorted keys. In the embodiment illustrated in FIG. 3, although every extract task 208 can pass data to every sort task 210, each sort task 210 passes data to one index build task 212.

The Building Indexes system 124 attempts to start up as many tasks as possible to increase the efficiency of building indexes and decrease the time in which the indexes are built. The memory available for tasks is one of the constraints to starting up multiple tasks. For the various scenarios that are possible by varying the different quantities discussed above, the greatest amount of memory is required for the scenario in which the number of indexes 214 being built, the number of extract tasks 208 being invoked, and the number of sort tasks 210 being invoked are each greater than one. In this scenario, each extract task 208 extracts the keys for each of the indexes 214 being built and passes them to each sort task 210 via a pipe 300. The sort task 210 sorts keys for the corresponding index 214 and passes the sorted keys to the index build task 212 that is building that index.

For the scenario in which multiple indexes are being built and multiple extract tasks 208 and sort tasks 210 are invoked, the memory requirement can be represented using the quantity symbols as follows in Equation 1:

$$M_u N_u + M_s N_s + M_b N_b + M_p N_u N_s + M_p N_b \leq VS \qquad [1]$$

$M_u N_u$ represents the amount of memory required by all of the extract tasks 208 and is calculated by multiplying the number of extract tasks 208 by the memory required by each extract task 208. $M_s N_s$ represents the amount of memory required by all of the sort tasks 210 and is calculated by multiplying the number of sort tasks 210 by the memory required by each sort task 210. $M_b N_b$ represents the amount of memory required by all of the index build tasks 212 and is calculated by multiplying the number of index build tasks 212 by the memory required by each index build task 212. $M_p N_u N_s$ represents the amount of memory required by the pipes 300 between the extract tasks 208 and the sort tasks 210 and is calculated by multiplying the memory required for a pipe 300 by the number of extract tasks 208 and the number of sort tasks 210 (i.e., the memory used for passing data between extract tasks 208 and sort tasks 210). $M_p N_b$ represents the memory required for the pipes 304 between the sort tasks 210 and the index build tasks 212 and is calculated by multiplying the memory required for a pipe 304 by the number of index build tasks 212 (i.e., the memory used for passing data between sort tasks and index build tasks). The sum of the memory requirements for building indexes must be less than or equal to the amount of memory available, VS.

Since there is one sort task 210 and one index build task 212 for each index 214, the number of sort tasks 210, $N_s$, equals the number of index build tasks 212, $N_b$, giving $N_s = N_b$, the memory requirement can be represented as follows in Equation 2, which was derived from Equation 1 above:

$$M_u N_u + (M_s + M_b) N_s + M_p N_s (N_u + 1) \leq VS \qquad [2]$$

Typically, the memory required for each sort task 210, $M_s$, is much larger than either the memory required for each extract task 208, $M_u$, or index build task 212, $M_b$, so the number of sort tasks is the critical factor in determining how many tasks should be started to efficiently build indexes.

The number of sort tasks can be determined by assuming that the number of extract tasks 208 equals the number of sort tasks 210, $N_u = N_s$, and solving the resulting quadratic equation as follows in Equations 3 and 4, which were derived from Equation 2 above:

$$M_p N_s^2 + (M_u + M_s + M_b + M_p) N_s - VS = 0 \qquad [3]$$

or:

$$N_s = \frac{-(M_u + M_s + M_b + M_p) + \sqrt{(M_u + M_s + M_b + M_p)^2 + 4 M_p VS}}{2 M_p} \qquad [4]$$

The memory requirements for each extract task 208, $M_u$, each sort task 210, $M_s$, and each index build task 212, $M_b$, are known quantities that are dependent on the system in which the Building Indexes system 124 is used.

In order to build indexes using the above Equations 1–4, the Building Indexes system first determines the amount of memory available in the system, VS. Then, the Building Indexes system 124 determines the amount of memory required for each pipe, $M_p$. The determination of this memory requirement is based on the size of the data to be passed via the pipes, and so the memory requirement is based on the sizes of the index keys to be extracted by the extract tasks 208 and passed to the sort tasks 210.

The Building Indexes system 124 determines the number of sort tasks 210 to be invoked for building the indexes. In particular, the Building Indexes system 124 solves Equation 4 above for $N_s$, the number of sort tasks 210. After determining the number of sort tasks 210 to be invoked, the Building Indexes system 124 determines the number of extract tasks 208 to be invoked.

In particular, the Building Indexes system 124 determines the largest number of tasks that can be started without exceeding the available memory, VS. If the number of indexes to be built is greater than the number of sort tasks 210, $N_s$, then the Building Indexes system 124 determines that $N_s$ extract 208, sort 210, and build 212 tasks should be invoked.

On the other hand, if the number of indexes to be built is less than the determined number of sort tasks 210, $N_s$, then the Building Indexes system 124 sets the number of sort tasks 210, $N_s$, and the number of index build tasks 212, $N_b$, equal to the number of indexes to be built. The Building Indexes system 124 then determines the optimal number of extract tasks 208 to invoke by solving the following Equation 5, which was derived from Equation 1 above:

$$N_u = \frac{VS - N_s(M_s + M_b + M_p)}{M_u + M_p N_s} \quad [5]$$

The Building Indexes system 124 determines the largest number of extract tasks 208, $N_u$, that can be started without exceeding the available memory, VS.

Figure 4:
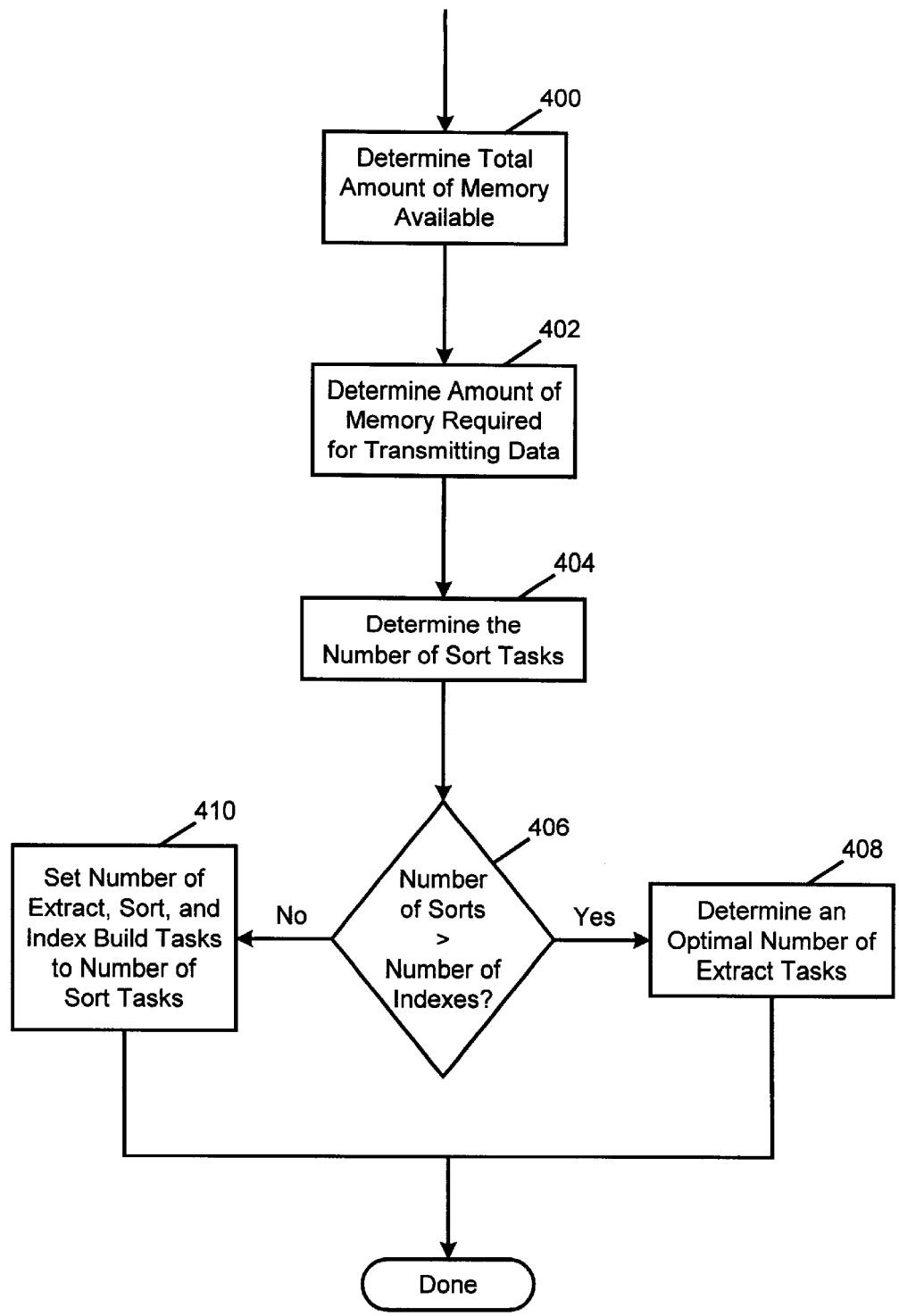
FIG. 4 is a flowchart illustrating the steps performed by the Building Indexes system to build indexes.

FIG. 4 is a flowchart illustrating the steps performed by the Building Indexes system 124 to build indexes. In Block 400, the Building Indexes system 124 determines the amount of memory available for use in building indexes. In Block 402, the Building Indexes system 124 determines the amount of memory required for transmitting data between tasks (i.e., the amount of memory required for each pipe). In Block 404, the Building Indexes system 124 determines the number of sort tasks 210 to be invoked. In Block 406, the Building Indexes system 124 determines whether the number of sort tasks 210 exceeds the number of indexes to be built. If the number of sort tasks 210 exceeds the number of indexes to be built, the Building Indexes system 124 continues to Block 408, otherwise, the Building Indexes system 124 continues to Block 410. In Block 408, the Building Indexes system 124 determines an optimal number of extract tasks 208 using Equation 5. In Block 410, the Building Indexes system 124 sets the number of extract 208, sort 210, and index build 212 tasks to the determined number of sort tasks 210.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

In summary, the present invention discloses a method, apparatus, and article of manufacture for a computer-implemented building indexes system. The present invention provides a more efficient index building system. The present invention also provides the ability to determine the number of sort tasks that can be invoked to build indexes. Moreover, the present invention provides the ability to determine the number of extract tasks that can be invoked to build indexes.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for determining a number of sort tasks to be used in building an index for a database, the database being stored in a data storage device coupled to a computer, the method comprising the steps of:
   receiving, at the computer, a number of indexes to be built;
   retrieving, from the computer, a value indicating an amount of memory available;
   retrieving, from the computer, a value indicating an amount of memory required by extract tasks, sort tasks, and index build tasks;
   determining, in the computer, an amount of memory for use in transmitting data between extract tasks, sort tasks, and index build tasks using the size of data passed between tasks; and
   determining, in the computer, a number of sort tasks to be used to build indexes, wherein the determination is made based on the retrieved amount of available memory, the retrieved task memory requirements, and the determined amount of memory for use in transmitting data between tasks.

2. The method of claim 1, further comprising, the step of, receiving an indication that a predefined number of indexes are to be built, and when the predefined number of indexes exceeds the determined number of sort tasks, invoking a number of extract tasks equivalent to the determined number of sort tasks.

3. The method of claim 1, further comprising, the step of, receiving an indication that a predefined number of indexes are to be built, and when the determined number of sort tasks exceeds the predefined number of indexes, determining an optimal number of extract tasks to be used to build the index without exceeding the amount of available memory.

4. The method of claim 3, wherein the step of determining the optimal number of extract tasks is based on the determined number of sort tasks.

5. The method of claim 1, wherein an extract task extracts multiple index keys for multiple indexes.

6. An apparatus for determining a number of sort tasks to be used in building an index for a database, comprising:
   a computer having a data storage device connected thereto, wherein the data storage device stores the database; and
   one or more computer programs, performed by the computer, for receiving, at the computer, a number of indexes to be built, retrieving, from the computer, a value indicating an amount of memory available, retrieving, from the computer, a value indicating an amount of memory required by extract tasks, sort tasks, and index build tasks, determining, in the computer, an amount of memory for use in transmitting data between extract tasks, sort tasks, and index build tasks using the size of data passed between tasks, and determining, in the computer, a number of sort tasks to be used to build indexes, wherein the determination is made based on the retrieved amount of available memory, the retrieved task memory requirements, and the determined amount of memory for use in transmitting data between tasks.

7. The apparatus of claim 6, further comprising, means for, receiving an indication that a predefined number of indexes are to be built, and when the predefined number of indexes exceeds the determined number of sort tasks, invoking a number of extract tasks equivalent to the determined number of sort tasks.

8. The apparatus of claim 6, further comprising, means for, receiving an indication that a predefined number of indexes are to be built, and when the determined number of sort tasks exceeds the predefined number of indexes, determining an optimal number of extract tasks to be used to build the index without exceeding the amount of available memory.

9. The apparatus of claim 8, wherein the means for determining the optimal number of extract tasks is based on the determined number of sort tasks.

10. The apparatus of claim 6, wherein an extract task extracts multiple index keys for multiple indexes.

11. An article of manufacture comprising a program storage device readable by a computer and tangibly embodying one or more programs of instructions executable by the computer to perform method steps for determining a number of sort tasks to be used in building an index for a database, the computer having a data storage device coupled thereto for storing the database, the method comprising the steps of:
receiving, at the computer, a number of indexes to be built;
retrieving, from the computer, a value indicating an amount of memory available;
retrieving, from the computer, a value indicating an amount of memory required by extract tasks, sort tasks, and index build tasks;
determining, in the computer, an amount of memory for use in transmitting data between extract tasks, sort tasks, and index build tasks using the size of data passed between tasks; and
determining, in the computer, a number of sort tasks to be used to build indexes, wherein the determination is made based on the retrieved amount of available memory, the retrieved task memory requirements, and the determined amount of memory for use in transmitting data between tasks.

12. The article of manufacture of claim 11, further comprising, the step of, receiving an indication that a predefined number of indexes are to be built, and when the predefined number of indexes exceeds the determined number of sort tasks, invoking a number of extract tasks equivalent to the determined number of sort tasks.

13. The article of manufacture of claim 11, further comprising, the step of, receiving an indication that a redefined number of indexes are to be built, and when the determined number of sort tasks exceeds the predefined number of indexes, determining an optimal number of extract tasks to be used to build the index without exceeding the amount of available memory.

14. The article of manufacture of claim 13, wherein the step of determining the optimal number of extract tasks is based on the determined number of sort tasks.

15. The article of manufacture of claim 11, wherein an extract task extracts multiple index keys for multiple indexes.

16. A computer-implemented method for determining a number of sort tasks to be used in building an index for a database, the database being stored in a data storage device coupled to a computer, the method comprising the steps of:
receiving, at the computer, a number of indexes to be built;
retrieving, from the computer, a value indicating an amount of memory available;
retrieving, from the computer, a value indicating an amount of memory required by extract tasks, sort tasks, and index build tasks;
determining, in the computer, an amount of memory for use in transmitting data between extract tasks, sort tasks, and index build tasks using size data passed between tasks; and
determining, in the computer, a number of sort tasks to be executed concurrently to build indexes, wherein the determination is made based on the retrieved amount of available memory, the retrieved task memory requirements, and the determined amount of memory for use in transmitting data between tasks.

17. The method of claim 16, further comprising, the step of, receiving an indication that a predefined number of indexes are to be built, and when the predefined number of indexes exceeds the determined number of sort tasks, invoking a number of extract tasks equivalent to the determined number of sort tasks.

18. The method of claim 16, further comprising, the step of, receiving an indication that a predefined number of indexes are to be built, and when the determined number of sort tasks exceeds the predefined number of indexes, determining an optimal number of extract tasks to be used to build the index without exceeding the amount of available memory.

19. The method of claim 18, wherein the step of determining the optimal number of extract tasks is based on the determined number of sort tasks.

20. The method of claim 16, wherein an extract task extracts multiple index keys for multiple indexes.

21. The method of claim 1, wherein the size data comprises sizes of index keys.

22. The method of claim 1, wherein the data is transmitted between an extract task and a sort task.

23. The method of claim 1, wherein the data is transmitted between a sort task and an index build task.

24. The method of claim 1, further comprising, the step of, building an index using sorted keys generated by a sort task.

25. The apparatus of claim 6, wherein the size data comprises sizes of index keys.

26. The apparatus of claim 6, wherein the data is transmitted between an extract task and a sort task.

27. The apparatus of claim 6, wherein the data is transmitted between a sort task and an index build task.

28. The apparatus of claim 6, further comprising, means for, building an index using sorted keys generated by a sort task.

29. The article of manufacture of claim 11, wherein the size data comprises sizes of index keys.

30. The article of manufacture of claim 11, wherein the data is transmitted between an extract task and a sort task.

31. The article of manufacture of claim 11, wherein the data is transmitted between a sort task and an index build task.

32. The article of manufacture of claim 11, further comprising, the step of, building an index using sorted keys generated by a sort task.

33. The method of claim 16, wherein the size data comprises sizes of index keys.

34. The method of claim 16, wherein the data is transmitted between an extract task and a sort task.

35. The method of claim 16, wherein the data is transmitted between a sort task and an index build task.

36. The method of claim 16, further comprising, the step of, building an index using sorted keys generated by a sort task.

* * * * *